Dec. 7, 1965 J. A. MIKUS 3,221,436

FISHING LURE

Filed Jan. 30, 1964

INVENTOR.
Julius A. Mikus
BY
Barnard, McGlynn & Reising
ATTORNEYS

3,221,436
FISHING LURE
Julius A. Mikus, 752 Elmsford, Clawson, Mich.
Filed Jan. 30, 1964, Ser. No. 341,174
13 Claims. (Cl. 43—42.17)

This invention relates to fishing lures and more particularly to a resiliently bodied lure having parts associated therewith which may be easily shifted from one position to another to change the action of the lure as it is pulled through the water.

In the design and manufacture of fishing lures, it is necessary that a device be provided which will readily attract the fish and cause the fish to strike at the lure. The attractiveness of the lure often depends upon its action as it is pulled through the water, and thus the coloring of the lure, as well as other visual or audible attractive means, are very important if the lure is to be successful. At the same time, the lure must be so designed as to resemble as closely as possible some type of food that the fish normally eats, in order to cause the fish to strike at the lure.

Heretofore fishing lures have been designed in many different sizes, shapes, styles, and colors and are generally manufactured of sheet metal, wood, or solid plastic materials. Such lures are normally lacquered, painted, or otherwise brightly decorated to attract the fish. Normally, each lure is designed for a single purpose and is imparted a particular action through the water. If the angler, or the fish, desires a different type of action, it is necessary to substitute another lure on the end of the fishing line and thus provide such different action. Most presently available lures, being of painted wood or solid plastic material, are often instantly ejected by the striking fish when he strikes the hard object and discovers that the object is not food. This gives the angler very little time to set the hook and catch the fish.

The device in which this invention is embodied comprises, generally, a lure having a resilient tubular body which may be brightly colored to visually attract the fish, the resiliency permitting the body portion to collapse when struck by the fish. The soft body, seeming more like food to the fish, is not instantly ejected and gives the angler more time to set the hook. A spinner device is attached to the body member and may be selectively positioned in either of two positions for varying actions of the lure as it is drawn through the water. In one position, the spinner is free to rotate relative to the body member so that when the lure is pulled through the water the spinner will rotate and the body will not. In the other position, the spinner is clamped to the body member and its rotation imparts rotation to the entire lure as it is pulled through the water. Additionally, the spinner may be formed of a malleable material sufficient to permit easy deformation and thus change in the action of the lure. For example, the spinner may be deformed to provide a bubbling action and create an audible signal as the lure is pulled through the water.

A lure constructed in this manner is extremely versatile and does not require the angler to possess a completely different lure for each desired lure action. Such a lure is easily manufactured and assembled on a production basis and may be made of such materials to avoid manufacturing hazards normally associated with paints, lacquers, and machinery which would otherwise be necessary with solid or painted wood types of lures. The resulting fishing lure is extremely efficient in its operation, extremely versatile in providing numerous different types of actions, and is easily manufactured and assembled.

These and other advantages will become more apparent from the following description and drawings in which.

Figure 1:
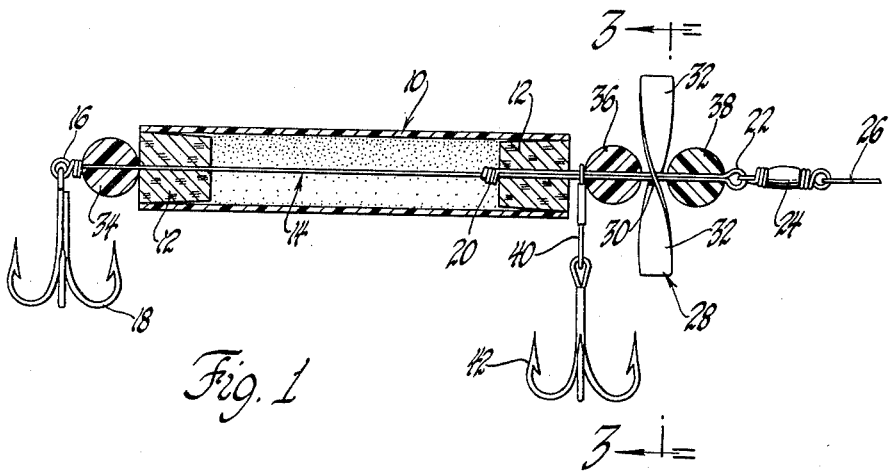
FIGURE 1 is an elevational view, with parts broken away and in section, of a fishing lure embodying the invention and illustrating the position of the various parts under one condition of operation.

Referring more particularly to the drawing, the fishing lure is shown to include a generally tubular body member, illustrated generally by the numeral 10. Body member 10 may be made of any suitable material which has a degree of resilience permitting the body to collapse inwardly as the fish's jaws strike the body. This gives the fish a feel which is much more like his usual food and avoids the instant ejection from the fish's mouth that usually accompanies painted wood or solid plastic lure bodies. The body member 10 is preferably made of a plastic material which may be in the form of molded plastic tubing or may be an extruded plastic material cut to the desired length. The body member 10 may be brightly colored and may have suitable designs or other markings thereon to create a visual attractiveness as the lure is pulled through the water.

Disposed in each end of the tubular body member 10 is a sealing plug 12, in fluid-type relation with the walls of the body 10 to prevent water from flowing into the interior of the tube. Plugs 12 may conveniently be formed of corks, suitably sized and shaped to fit within the ends of the tube 10.

Extending through the corks 12 and completely through the body member 10 is an elongated member, illustrated generally by the numeral 14, which may be a suitably sized metallic wire or the like. A loop 16 is formed in the rearward end of wire 14 to receive the usual gang hook 18. The forward end of wire 14 is doubled back upon itself, for purposes to become hereinafter more apparent, and terminates inwardly of the tube 10 in a securing coil or wrap 20. The forward end of the wire 14 is provided with a suitable loop 22 to receive a swivel device or the like 24 for attachment to the fishing line 26 in the well known manner.

The corks 12 and the holes therethrough for the wire 14 are so formed as to tightly grip the wire as it passes through, thus providing frictional engagement with the wire 14 and maintaining the wire in one position or another, as will become hereinafter more apparent.

Mounted on wire 14 and forwardly of the body member 10 is a spinner, illustrated generally by the numeral 28, provided with a central aperture 30 slightly larger than the doubled section of the wire 14. The spinner 28 is formed to provide blades 32, which are so directed as to cause a rotating movement as the lure is pulled through the water. Spinner 28 is formed of a malleable material which may easily be deformed in order to provide varying actions to the lure and thus varying types of attractiveness to the fish. For example, the blades of the spinner may be shaped in spoon fashion and if an erratic or slipping motion is desired as the lure is pulled through the water, the upper blade or blades may be bent rearwardly to lie along the tube 10. The lower blade will then cause the desired movement. Should the spinning effect be again desired, the upper blade may be easily bent back to its original shape to form the propeller or spinner 32. Spinner 28 may be brightly colored so as to reflect light rays from the sun, moon, or other light sources as it spins in the water, thus attracting the attention of the fish.

Also disposed on wire 14 are a plurality of brightly colored beads, illustrated by the numerals 34, 36, and 38. These beads may be formed of a plastic material and are of bright colors to add to the visual attractiveness of the lure in general. Bead 34 is disposed at the rearward end of the body 10 and between the loop 16 and cork 12. This separates the hook 18 from the body to permit free movement of the hook without interference with the body 10. Beads 36 and 38 are disposed forwardly of the body 10, one on either side of the spinner 28. All three of these beads are mounted for sliding movement on the wire 14.

Also slidably mounted on the wire 14 and forwardly of the body member 10 is a snap device 40 which is slidable on the wire 14. Snap device 40 permits the addition of a second gang hook or the like 42, should such be desirable, and is so formed as to permit easy removal of the gang hook 42 when it is unnecessary.

Figure 2:
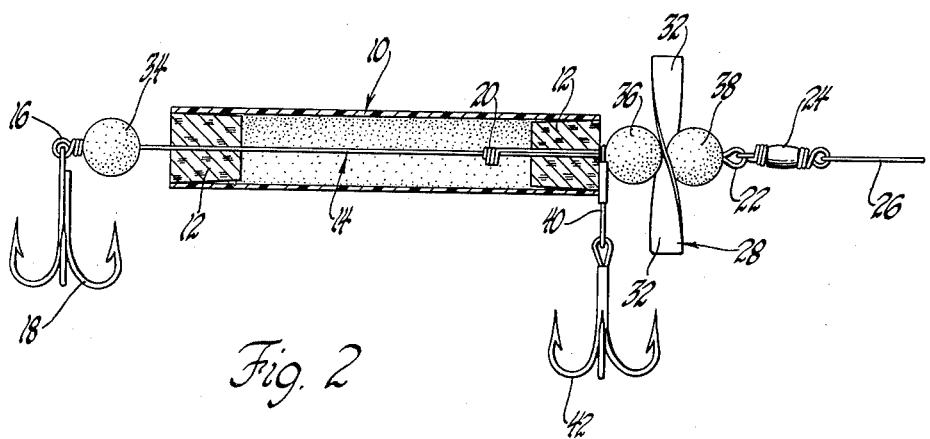
FIGURE 2 is an elevational view, with parts broken away and in section, similar to FIGURE 1, showing the position of the various parts under another condition of operation.
Figure 3:
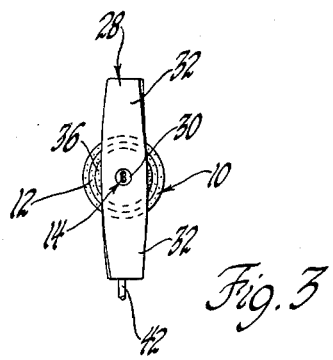
FIGURE 3 is an end view of the fishing lure shown in FIGURE 1, taken substantially along the line 3—3 of FIGURE 1 and looking in the direction of the arrows.

The versatility of the fishing lure is illustrated by the difference between FIGURES 1 and 2 of the drawing. In FIGURE 1, the beads 36 and 38 are shown spaced from the spinner 28 and spaced from the body 10. With the parts in this position, the spinner 28 is free to rotate about the doubled over wire 14, and the body member 10 remains in a nonrotative position relative to the spinner as the lure is pulled through the water. However, with the parts as illustrated in FIGURE 2, the entire lure rotates.

In FIGURE 2, the beads 36 and 38 are shown abutting the spinner 28, the snap hook 40, and the body member 10. This is accomplished by pulling the wire 14 rearwardly, that is, the beads and spinner, against the body 10, and the resulting action is a rotation of the entire lure with the rotation of the spinner 28. The wire 14 is maintained in its rearward, or FIGURE 2 position, by the frictional engagement between the corks 12 and the wire 14. To provide erratic movement to the lure, the upper blade of spinner 28 may be bent rearwardly, with the wire 14 in its rearward position, thus creating a forward spoon on the lure.

When it is desired to have rotational movement of the spinner alone, it is only necessary to pull the wire 14 forwardly, relative to the body 10, thus separating the beads 36 and 38 from the spinner 28. The inner wrap or coil 20 at the end of the doubled over portion of wire 14 serves as a stop means, along with the bead 34 and loop 16 at the rearward end of the lure, the wrap 20 and bead 34 abutting the two corks 12 to properly limit the forward movement of the wire 14 relative to the body.

The lure may also be converted between surface movement in the water or deep movement in the water by merely piercing the body tube 10 with one of the hooks attached to the lure. By piercing the body 10, water may be made to flow into the interior of tube 10 and thus increase its weight, causing the lure to sink deeper into the water. The point of the hook, being extremely small, will provide a hole in the body of small enough size that surface tension of the water may be utilized to advantage. Since such a small hole is provided, it may be necessary to squeeze the body 10 and place it under water to fill the body for deep water running. Once in, the water will not flow out because of its surface tension until the body 10 is again squeezed to expel the water from within. The lure is then in condition for surface running, and surface tension will prevent water from getting back into the body.

Thus, a fishing lure is provided which is extremely inexpensive to manufacture and assemble and yet is extremely versatile in its many operations. The lure may be converted from a nonrotating to a rotating lure or from a surface lure to a deep water lure; and additionally, the spinner may be easily deformed to create varying types of action as the lure is pulled through the water. This relieves the angler from having a tackle box full of similar type lures, each one adapted to a different type of action or different type of motion. The resilient body of the lure, by collapsing in the jaws of the fish, permits the angler more times to set the hooks for catching the fish. The result is a much more effective fishing lure, both for attracting the fish in the first instance and permitting more time to catch the fish once he has been attracted.

Many modifications and alterations to the structure will now become apparent to those having skill in the art after having had reference to the foregoing description and drawing. However, it is not intended to limit the scope of the invention by the foregoing, but by the appended claims in which, I claim:

1. A fishing lure comprising:
a tubular body member formed of a resilient material;
sealing means in fluid tight engagement with each end of said body member;
elongated means extending through said tubular member and through said sealing means and adapted to be selectively maintained in one of two positions axially thereof by engagement with said sealing means, the rearward extremity of said elongated means being adapted to receive a gang hook, and the forward end of said elongated means being adapted to be secured to a fishing line;
a spinner rotatably mounted on said elongated means and forwardly of said body member;
and means slidably mounted on said elongated means forwardly of said body member and spaced from said spinner in one position of said elongated means to permit free rotation of said spinner relative to said body member as said lure is pulled through the water, said means being adapted to abut said spinner and clamp said spinner to said body member in another position of said elongated means to cause rotation of said body member with said spinner as said lure is pulled through the water.

2. A fishing lure comprising:
a tubular body member formed of a resilient material;
sealing means in fluid tight engagement with each end of said body member;
a wire extending through said body member and said sealing means and in frictional engagement therewith adapted to be maintained in either of at least two axial positions relative to said body member by said frictional engagement with said sealing means, the rearward extremity of said wire being adapted to receive a gang hook, and the forward extremity of said wire being adapted to be secured to a fishing line;
a spinner rotatably mounted on said wire forwardly of said body member;
and means slidably mounted on said wire and forwardly of said body member and permitting free rotation of said spinner relative to said body member in one position of said wire as said lure is pulled through the water, and said means being operable to engage said spinner in another position of said wire to cause rotation of said body member with said spinner as said lure is pulled through the water.

3. The fishing lure set forth in claim 2 wherein said spinner is formed of a malleable material to permit easy deformation thereof and change in the action of said lure as it is pulled through the water.

4. The fishing lure set forth in claim 2 wherein said means on said wire includes a pair of beads disposed on opposite sides of said spinner and adapted to clamp said spinner therebetween upon movement of said wire to said other position.

5. The fishing lure set forth in claim 4 and further including a bead disposed on said wire and rearwardly of said body member to space said hook from said body member.

6. The fishing lure set forth in claim 2 and further including means on said wire and forward of said body member adapted to receive and secure a second hook.

7. A fishing lure comprising:
a resilient tubular body member formed of a material adapted to be brightly colored;
a cork disposed in fluid tight engagement in each end of said body member;
a wire extending through said corks and extending beyond each end of said body member, said wire being movable axially of said body member and frictionally positioned by said cork in any of a plurality of positions;
a gang hook secured to one end of said wire;
a bead slidably mounted on said wire and between said gang hook and said body member;
a malleable spinner rotatably mounted on said wire and adjacent the other end thereof;
a pair of beads disposed on said wire and on either side of said spinner, said beads in one position of said wire being spaced from said spinner to permit free rotation thereof independent of said body and in another position of said wire being in clamping engagement with said spinner such that rotation of said spinner causes rotation of said body member;
a swivel mounted on the extreme end of said wire and adapted to be secured to a fishing line;
and a snap hook mounted on said wire and between said pair of beads and said body member and adapted to receive and retain a second gang hook.

8. A fishing lure comprising:
a resilient body member adapted to be secured to a fishing line and having a hook secured thereto;
a rotatable spinner movably secured to said body member, said spinner being rotatable relative to said body member in one position as said lure is pulled through the water in one direction;
and manually shiftable means for fixing said spinner relative to said body member in another position to cause rotation of said body member therewith as said lure is pulled through the water in said one direction.

9. The fishing lure set forth in claim 8 and further including an elongated member extending through said body member and supporting said spinner.

10. The fishing lure set forth in claim 8 wherein said body member is formed of a plastic tube.

11. The fishing lure set forth in claim 10 and further including sealing means disposed in fluid tight engagement in each end of said tube.

12. The fishing lure set forth in claim 11 and further including an elongated member extending through said sealing means and said tube and supporting said spinner, and said sealing means frictionally engaging said elongated member to selectively maintain said elongated member in said one position or said other position.

13. The fishing lure set forth in claim 12 and further including a pair of beads slidably disposed on said elongated member and on opposite sides of said spinner, said beads being axially spaced from said spinner in said one position of said spinner to permit free rotation thereof, and said beads abutting said spinner and said body member in said other position of said spinner to cause rotation of said body member with said spinner.

References Cited by the Examiner
UNITED STATES PATENTS

| | | | |
|---|---|---|---|
| 1,427,147 | 8/1922 | Barsch | 43—42.16 X |
| 1,758,344 | 5/1930 | Wright et al. | 43—42.17 X |
| 1,905,567 | 4/1933 | Pflueger | 43—42.17 X |
| 2,573,592 | 10/1951 | Nickel | 43—42.22 X |

ABRAHAM G. STONE, *Primary Examiner.*